US008837942B2

(12) United States Patent
Kang (10) Patent No.: US 8,837,942 B2
(45) Date of Patent: Sep. 16, 2014

(54) APPARATUS AND METHOD FOR PACKET-OPTICAL INTEGRATED TRANSPORT

(75) Inventor: Tae Kyu Kang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 785 days.

(21) Appl. No.: 12/938,630

(22) Filed: Nov. 3, 2010

(65) Prior Publication Data

US 2011/0135302 A1 Jun. 9, 2011

(30) Foreign Application Priority Data

Dec. 7, 2009 (KR) .......................... 10-2009-0120540
Mar. 9, 2010 (KR) .......................... 10-2010-0020892

(51) Int. Cl.
*H04J 14/00* (2006.01)
*H04L 12/931* (2013.01)
*H04L 12/721* (2013.01)
*H04J 14/02* (2006.01)
*H04J 3/16* (2006.01)

(52) U.S. Cl.
CPC ............. *H04L 49/351* (2013.01); *H04J 14/021* (2013.01); *H04L 45/62* (2013.01); *H04J 14/0269* (2013.01); *H04J 3/1658* (2013.01); *H04J 14/0257* (2013.01)

USPC ................ 398/51; 398/54; 398/57; 398/83

(58) Field of Classification Search
USPC .......................... 398/51, 54, 83, 57
See application file for complete search history.

(56) References Cited

U.S. PATENT DOCUMENTS

| | | | |
|---|---|---|---|
| 8,155,520 B1* | 4/2012 | West et al. ...................... | 398/50 |
| 2005/0078685 A1 | 4/2005 | MacLean et al. | |
| 2006/0257143 A1* | 11/2006 | Cavazzoni et al. .............. | 398/49 |
| 2008/0002975 A1* | 1/2008 | Vukovic et al. ................. | 398/57 |
| 2010/0104279 A1* | 4/2010 | Vukovic et al. ................. | 398/42 |

FOREIGN PATENT DOCUMENTS

WO  WO 2009031848 A2 * 3/2009

* cited by examiner

*Primary Examiner* — Daniel Dobson
(74) *Attorney, Agent, or Firm* — Staas & Halsey LLP (57) ABSTRACT

A packet-optical integrated transport apparatus includes a packet transmitter for outputting single-wavelength signal multiplexed to a preset channel on the basis of packet traffic or circuit traffic input from a metro access region, and an optical transmitter for multiplexing the single-wavelength signal output from the packet transmitter to a multi-channel wavelength signal and adding or dropping the multiplexed multi-channel wavelength signal to or from a node. The apparatus further includes a system controller for transmitting constituent element initialization information to the packet transmitter and the optical transmitter and receiving constituent element operation status information.

11 Claims, 6 Drawing Sheets

APPARATUS AND METHOD FOR PACKET-OPTICAL INTEGRATED TRANSPORT

CROSS-REFERENCE TO RELATED APPLICATION

This application claims priority to and the benefit of Korean Patent Application Nos. 10-2009-0120540 and 10-2010-0020892 filed in the Korean Intellectual Property Office on Dec. 7, 2009 and Mar. 9, 2010, the entire contents of which are incorporated herein by reference.

BACKGROUND OF THE INVENTION (a) Field of the Invention

The present invention relates to an apparatus and method for packet-optical integrated transport performing integrated switching of a multi-layer packet and an optical signal by a single system in wire/wireless environment.

(b) Description of the Related Art

A general packet-optical transport network has an overlay structure in which there are mixed a packet-based router network (e.g. IP/Ethernet) and a circuit-based transport network (e.g. a synchronous optical network/synchronous digital hierarchy (SONET/SDH), a wavelength division multiplexing (WDM)), which is complicated since apparatus for individual functional layers are scattered and managed.

The packet-based router network has a structure performing unnecessary multi-hop routing even though more than half of transport network traffic has a traffic transition characteristic, which degrades the quality of multimedia-service-based premium traffic. Further, in order to expand the network, it needs an expensive large-capacity router.

Network traffic of the circuit-based transport network becomes IP-packet-centric from time division multiplexer (TDM)-circuit-centric because of rapid development of the Internet field. However, the circuit-based transport network has an inefficient structure to transport IP traffic increasing as composed to TDM traffic and needs a dedicated circuit having an expansive structure having a low degree of wire integration, and long standby time for new services.

Communication service providers continuously expand existing networks and implement new networks in order to accommodate a continuous increase of Internet traffic caused by wire/wireless services developing to a triple play service (TPS) (e.g., VoIP, IPTV, Managed Internet, etc.), a quadruple play service (QPS) (e.g., TPS+3G/WiMAX/LTE, etc.). However, it is very inefficient in terms of installation investment costs and operation/administration/maintenance costs such as complexity of infrastructure expansion, operation and management, an increase of power consumption, complexity of interlayer network resource control, and complexity of network resource assignment.

For these reasons, various additional techniques are being discussed in order to the above-mentioned problems in companies associated with the packet-based router network and the circuit-based transport network. However, the individual techniques have technical limits. Therefore, in order to overcome the technical limits, network development is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for packet-optical integrated transport having advantages of processing multi-layer packet and optical transport signals in one system to integrate packet-optical transport networks, which have multiple network structures and exist in individual functional layers, into a single network structure.

An exemplary embodiment of the present invention provides a packet-optical integrated transport apparatus including a packet transmitter configured to output single-wavelength signal multiplexed to a preset channel on the basis of packet traffic or circuit traffic input from a metro access region; an optical transmitter configured to multiplex the single-wavelength signaloutput from the packet transmitter to a multi-channel wavelength signal and add or drop the multiplexed multi-channel wavelength signal to or from a node; and a system controller configured to transmit constituent element initialization information to the packet transmitter and the optical transmitter and receive constituent element operation status information.

Another embodiment of the present invention provides a packet-optical transport method for a packet-optical integrated transport apparatus including outputting connection oriented Ethernet (COE) tunnel information by using packet traffic input from a metro access region; switching the packet by checking a destination of the packet traffic from the COE tunnel information; forwarding the switching packet to a corresponding port by analyzing the COE tunnel information; and multiplexing the forwarded packet to a multi-channel wavelength signal and adding or dropping the multi-channel wavelength signal to or from a node.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In specification, unless explicitly described to the contrary, the word "comprise" and variations such as "comprises" or "comprising", will be understood to imply the inclusion of stated elements but not the exclusion of any other elements.

Hereinafter, an apparatus and method for packet-optical integrated transport according to embodiments of the present invention will be described in detail with reference to the accompanying drawings.

FIGS. 1A to 1D are views illustrating the configuration of a packet-optical integrated transport apparatus according to an exemplary embodiment of the present invention.

Figure 1A:
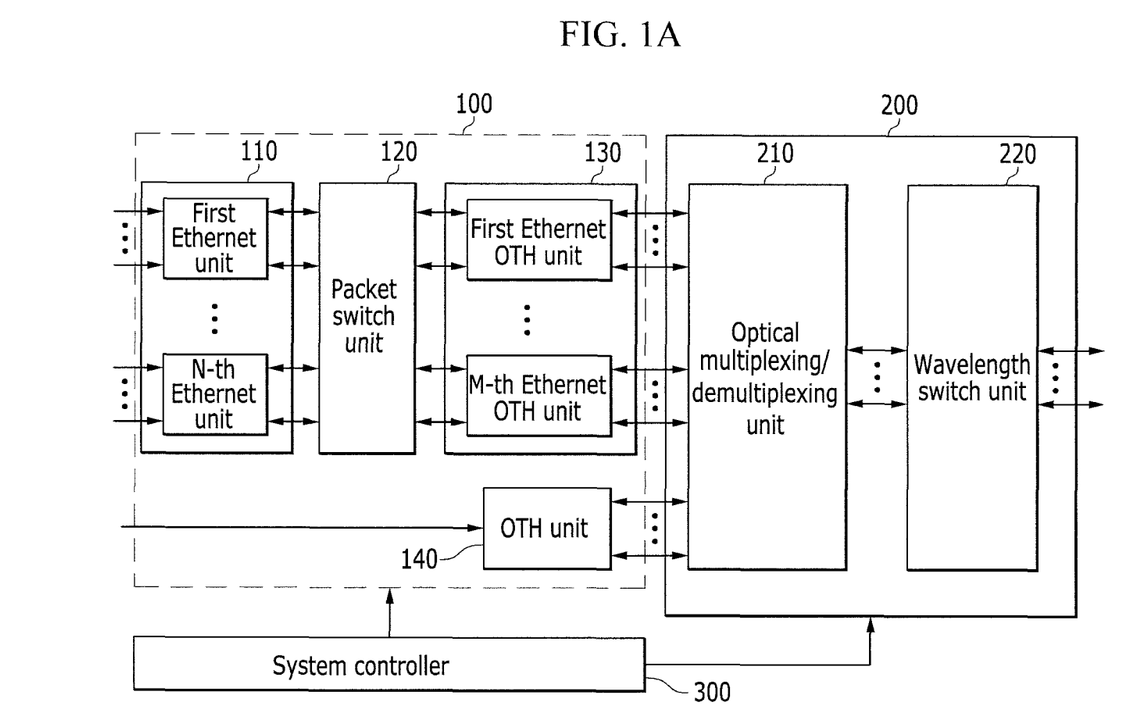
FIGS. 1A to 1D are views illustrating the configuration of a packet-optical integrated transport apparatus according to an exemplary embodiment of the present invention.

The packet-optical integrated transport apparatus performs a function of transmits packet and circuit traffic input from a metro access/edge region to a destination through a metro edge/core network. At this time, the packet and circuit traffic is transmitted to the destination on the basis of hierarchical mapping information and quality of service (QoS) information preset to the apparatus through an external network control system on the basis of a service level specification contracted between a service user and a service provider.

Here, the network control system may be a network management system (NMS) or an operating support system (OSS), for example. Further, the hierarchical mapping information may be Ethernet-to-connection oriented Ethernet (ETH-to-COE), IP flow-to-COE, connection oriented Ethernet-to-optical channel transport unit (COE-to-OTU) or OTU-to-WDM, for example. The network control system and the hierarchical mapping information are well-known and thus descriptions thereof are omitted in the embodiments of the present invention.

To this end, as shown in FIG. 1A, a packet-optical integrated transport apparatus includes a packet transmitter 100, an optical transmitter 200, and a system controller 300.

The packet transmitter 100 outputs multiplexed traffic to a channel preset on the basis of packet traffic or circuit traffic input from an Ethernet switch or router or TDM switch in a metro access region. The packet transmitter 100 includes an Ethernet unit 110 having a plurality of Ethernet line cards 111, a packet switch unit 120, and an Ethernet-optical transport hierarchy (OTH) unit 130 and an OTH unit 140 each of which includes a plurality of Ethernet OTH line cards 131. The optical transmitter 200 multiplexes the traffic packet having a single wavelength output from the packet transmitter 100 to multi-channel wavelength signals and adds or drops the multi-channel wavelength signals to or from a node. The optical transmitter 200 includes an optical multiplexing/demultiplexing unit 210 and a wavelength switch unit 220.

Figure 1B:
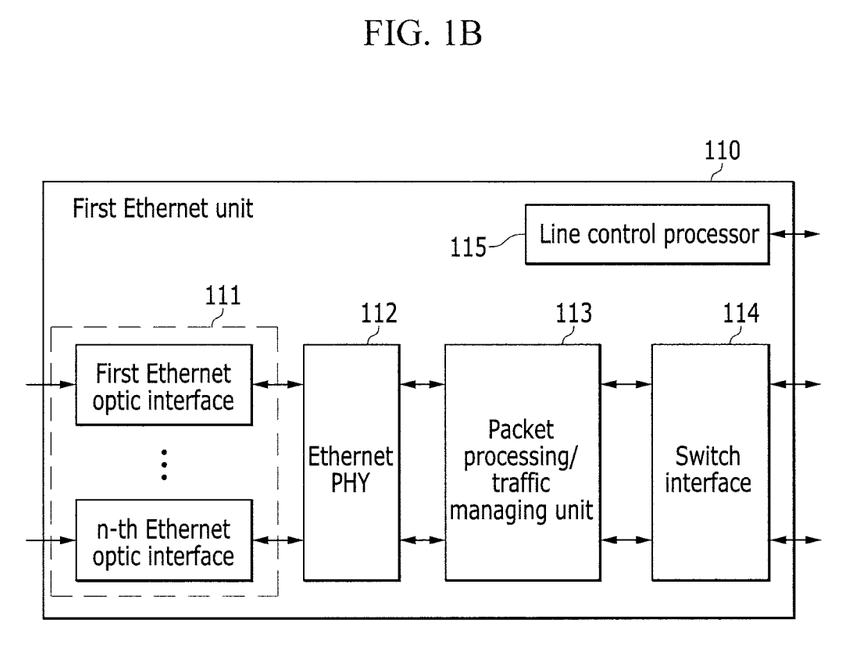

First, the Ethernet unit 110 of the packet transmitter 100 is configured to output COE tunnel information by using the packet traffic. As shown in FIG. 1B, the Ethernet unit 110 includes a plurality of Ethernet optic interfaces 111, an Ethernet PHY 112, a packet processing/traffic managing unit 113, a switch interface 114, and a line control processor 115.

Each of the plurality of Ethernet optic interfaces 111 receives the packet traffic input from the Ethernet switch or router in the metro access region and transmits the packet traffic to the Ethernet PHY 112.

The Ethernet PHY 112 extracts an Ethernet frame from the packet traffic received from each of the plurality of Ethernet optic interfaces 111.

The packet processing/traffic managing unit 113 analyzes information on an L2 (layer 2) header or an L3 (layer 3) header of the Ethernet frame extracted by the Ethernet PHY 112 and performs processing such as lookup (connection-oriented Ethernet (COE) tunnel lookup). Then, the packet processing/traffic managing unit 113 defines an Ethernet flow for forwarding packets on the basis of the L2 header information and performs ETH-to-COE encapsulation for mapping the defined Ethernet flow to a COE tunnel. The packet processing/traffic managing unit 113 may define an IP flow (e.g., best effort video, video on demand (VoD), Internet phone (VoIP: Voice over IP), etc.) on the basis of the L2/L3 header information and perform IP FLOW-to-COE encapsulation for mapping the IP flow to a COE tunnel.

Further, the packet processing/traffic managing unit 113 performs polishing, shaping, scheduling, and so on, in order to ensure the QoS of the COE tunnel. Here, the QoS of the COE tunnel includes a committed information rate (CIR), an excess information rate (EIR), a committed burst size (CBS), or an excess burst size (EBS) regarding a band profile, or jitter or delay regarding a performance profile; however, it is not necessarily limited thereto.

The switch interface 114 connects the Ethernet unit 110 and the packet switch unit 120. To this end, the switch interface 114 performs transformation into a physical interface signal standard or inverse transformation thereof.

The line control processor 115 receives constituent element initialization information including a COE mapping table from the system controller 300 through a management interface and initializes constituent elements of the Ethernet unit 110. The line control processor 115 may report constituent element operation status information including an operation, administration, and maintenance (OAM) to the system controller 300.

The packet switch unit 120 operates in dual active mode, checks the destination of each packet having the COE tunnel information received from the Ethernet unit 110, and performs switching to a corresponding Ethernet-OTH unit 130 or an inverse process thereof. Further, the packet switch unit 120 receives the constituent element initialization information including packet switching information from the system controller 300 through the management interface by using the line control processor 115 of the Ethernet unit 110 or reports the constituent element operation status information to the system controller 300.

Figure 1C:
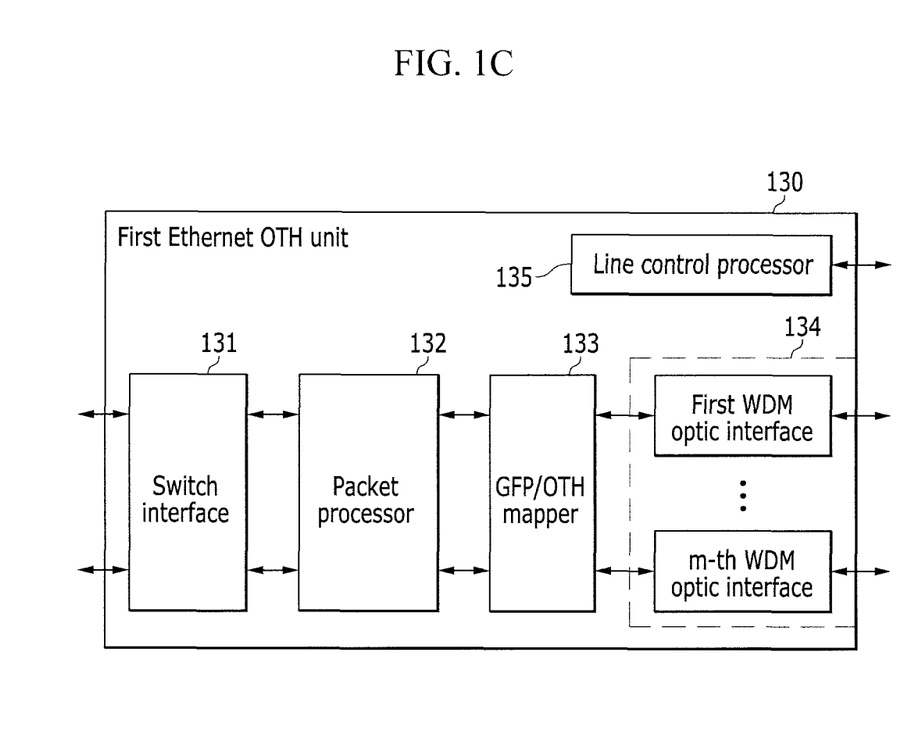

The Ethernet-OTH unit 130 is configured to analyze the COE tunnel information through a packet processor and forward the packet switched from the packet switch unit 120 on the basis of the analyzed result. As shown in FIG. 1C, the Ethernet-OTH unit 130 includes a plurality of switch interfaces 131, a packet processor 132, a GFP/OTH mapper 133, a plurality of WDM optic interfaces 134, and a line control processor 135.

The plurality of switch interfaces 131 connects the packet switch unit 120 and the Ethernet-OTH unit 130.

The packet processor 132 performs processes such as analyzing of the COE tunnel information and lookup (output port lookup) on the packet received from the packet switch unit 120 through the switch interfaces 131 and forwards the packet to a corresponding port.

The generic framing procedure & optical transport hierarchy (GFP/OTH) mapper 133 performs the COE-to-OTU encapsulation for mapping a COE tunnel to an optical channel transport unit-2 (OTU-2) channel through an optical transport network (OTN) framing.

Next, the plurality of WDM optic interfaces 134 transmitts the packet to the optical multiplexing/demultiplexing unit 210 of the optical transmitter 200 as a single wavelength signal by carrying the packet on a single wavelength assigned to each Ethernet-OTH unit 130, or performs an inverse process thereof.

The line control processor 135 receives the constituent element initialization information including packet forwarding information from the system controller 300 through the management interface and initializes constituent elements of the Ethernet-OTH unit 130, or reports operation status information on the constituent elements of the Ethernet-OTH unit 130 to the system controller 300.

Figure 1D:
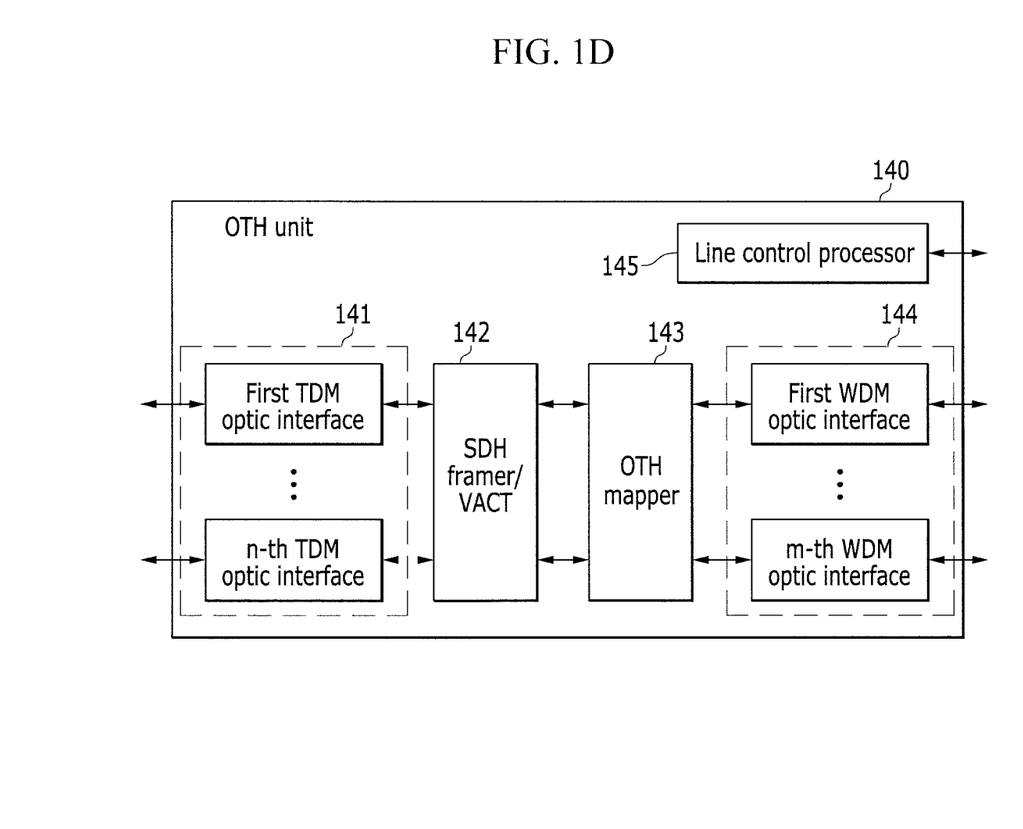

The OTH unit 140 configured to receive the circuit traffic and superpose the circuit traffic on an assigned single wavelength includes a plurality of TDM optic interfaces 141, an SDH framer/virtual concatenation (VACT) 142, an OTH mapper 143, a plurality of WDM optic interfaces 144, and a line control processor 145, as shown in FIG. 1D.

The plurality of TDM optic interfaces 141 receive the circuit traffic from an synchronous optical network/synchronous digital hierarchy (SONET/SDH) device in a metro edge region and transmit the circuit traffic to the SDH framer/VACT 142.

The SDH framer/VACT 142 multiplexes the circuit traffic received from each of the plurality of TDM optic interfaces 141 to the OTU-2 channel, and the OTH mapper 143 performs one-to-one frame mapping on the circuit traffic multiplexed to the OTU-2 channel.

The plurality of WDM optic interfaces 144 superposes the circuit traffic on a single wavelength signal assigned to the OTH unit 140 and transmits it to the optical multiplexing/demultiplexing unit 150, or performs an inverse process thereof.

The line control processor 145 receives the constituent element initialization information from the system controller 300 through the management interface to initialize constituent elements of the OTH unit 140, or to report operation status information on the constituent elements of the OTH unit 140 to the system controller 300.

Next, the optical multiplexing/demultiplexing unit 210 of the optical transmitter 200 multiplexes a single wavelength signal corresponding to the OTU-2 channel received from each Ethernet-OTH unit 130 or OTH unit 140 to a multi-channel wavelength signal in order to transmit the single wavelength signal to a signal fiber, or performs an inverse process thereof. At this time, in order for multiplexing to the multi-channel wavelength signal, OTU-to-WDM transformation is performed and the multiplexed multi-channel wavelength signal is transmitted to the wavelength switch unit 220.

The wavelength switch unit 220 performs a function of adding or dropping the multi-channel wavelength signal received from the optical multiplexing/demultiplexing unit 210 to or from the node. At this time, it is possible to add or drop a set specific wavelength to or from the node without performing optical-electrical-optical (O-E-O) transformation of the multi-channel wavelength signal.

The system controller 300 transmits table or control information necessary for the operation to each of the plurality of Ethernet unit 110, the packet switch unit 120, the plurality of Ethernet-OTH units 130 and the OTH unit 140, the optical multiplexing/demultiplexing unit 210, and the wavelength switch unit 220, or receives and manages operation status information of each constituent element.

An interlayer data flow using a packet-optical integrated transport apparatus as described above will be described with reference to FIG. 2.

Figure 2:
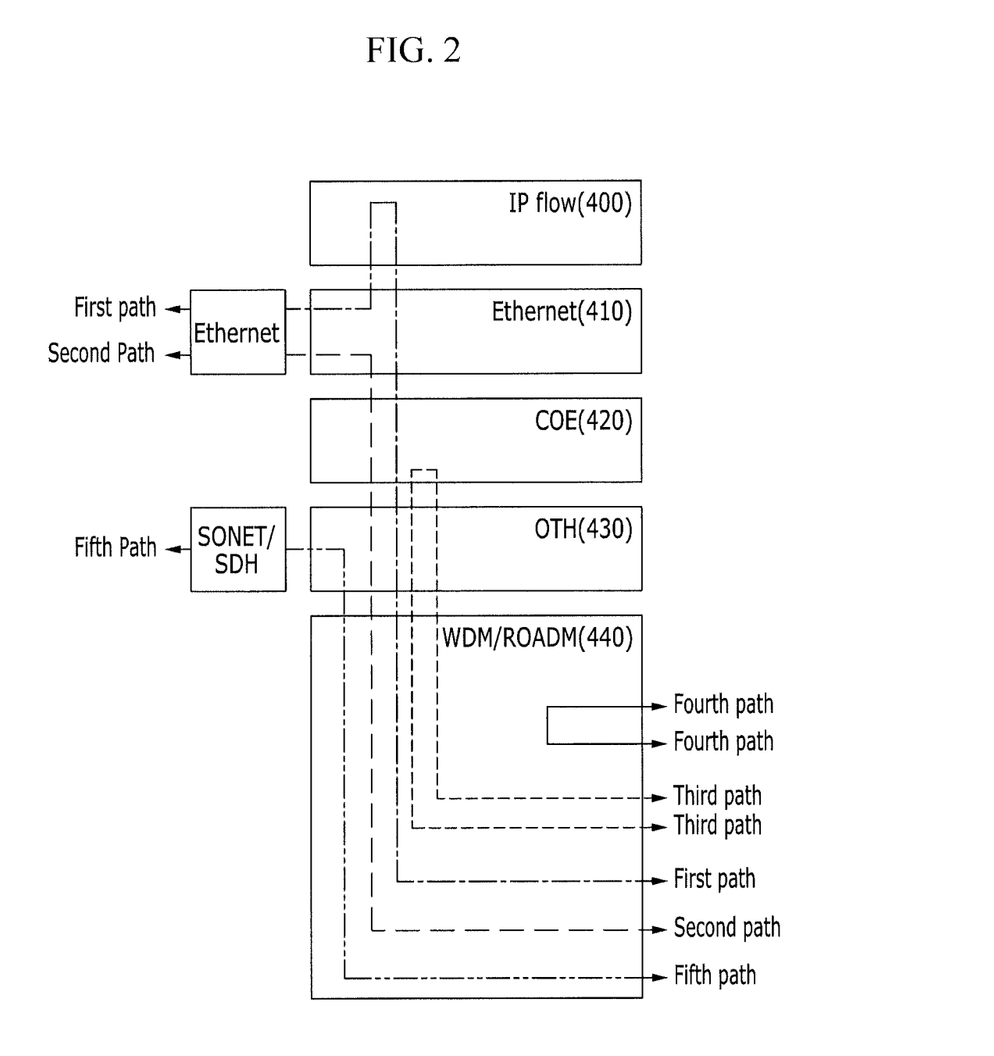
FIG. 2 is a view illustrating an example of an interlayer data flow of a packet-optical integrated transport apparatus according to an exemplary embodiment of the present invention.

FIG. 2 is a view illustrating an example of an interlayer data flow of a packet-optical integrated transport apparatus according to an exemplary embodiment of the present invention.

As shown in FIG. 2, the packet-optical integrated transport apparatus may be divided into functional layers, that is, an IP flow layer 400, an Ethernet layer 410, a COE layer 420, an OTH layer 430, and a wavelength division multiplexing/reconfigurable optical add/drop multiplxer (WDM/ROADM) layer 440. However, the present invention is not necessarily limited thereto.

Among Interlayer data according to traffic input to the packet-optical integrated transport apparatus, data input to the IP flow layer 400, the Ethernet layer 410, and COE layer 420 is processed in the packet processing/traffic managing unit 113 of the Ethernet unit 110 shown in FIG. 1B. Further, data input to the OTH layer 430 is processed in the GFP/OTH mapper 133 of the Ethernet-OTH unit 130 shown in FIG. 1C or the OTH mapper 143 of the OTH unit 140 shown in FIG. 1D. Furthermore, data input to the WDM/ROADM layer 440 is processed in the optical transmitter 200 including the optical multiplexing/demultiplexing unit 210 and the wavelength switch unit 220 shown in FIG. 1A.

In the embodiment of the present invention, data flow paths of the total five cases will be described as examples. First, a signal of a first path defines an IP flow regarding the packet traffic input through an IP access network in the IP flow layer 400 by using the L2 and L3 header information. Here, the IP flow includes best effort video, VoIP, or VoD, for example.

If the IP flow is defined in the IP flow layer 400, the IP flow is mapped to the COE tunnel through the COE layer 420, and the COE tunnel is mapped to the OTU-2 channel in the OTH layer 430. Next, in the WDM/ROADM layer 440, the OTU-2 channel is superimposed on a WDM wavelength and is transmitted to the metro edge/core network. That is, the IP flow, the COE tunnel, the OTU channel, and the WDM wavelength are hierarchically mapped in their order.

A signal of a second path defines an Ethernet flow regarding the packet traffic input through an Ethernet access network by using the L2 header information, and maps the Ethernet flow to the COE tunnel in the COE layer 420. The OTH layer 430 maps the COE tunnel to the OTU-2 channel, and the, WDM/ROADM layer 440 superposes the mapped OTU-2 channel on the WDM wavelength and transmits the mapped OTU-2 channel to the metro edge/core network.

A signal of a third path is related to a case in which traffic input through the metro edge/core network is transited in the COE layer 420, and a signal of a fourth path is related to a case in which traffic input through the metro edge/core network is transited at a wavelength level of the WDM/ROADM layer 440. A signal of a fifth path maps circuit traffic input through the metro edge network to the OTU-2 channel in the OTH layer 430, and superposes the OTU-2 channel on a WDM wavelength and transmits the OTU-2 channel to the metro edge/core network by the WDM/ROADM layer 440.

Next, a packet-optical transport method for a packet-optical integrated transport apparatus will be described with reference to FIG. 3. The embodiment of the present invention will be described in relation to packet traffic as an example.

Figure 3:
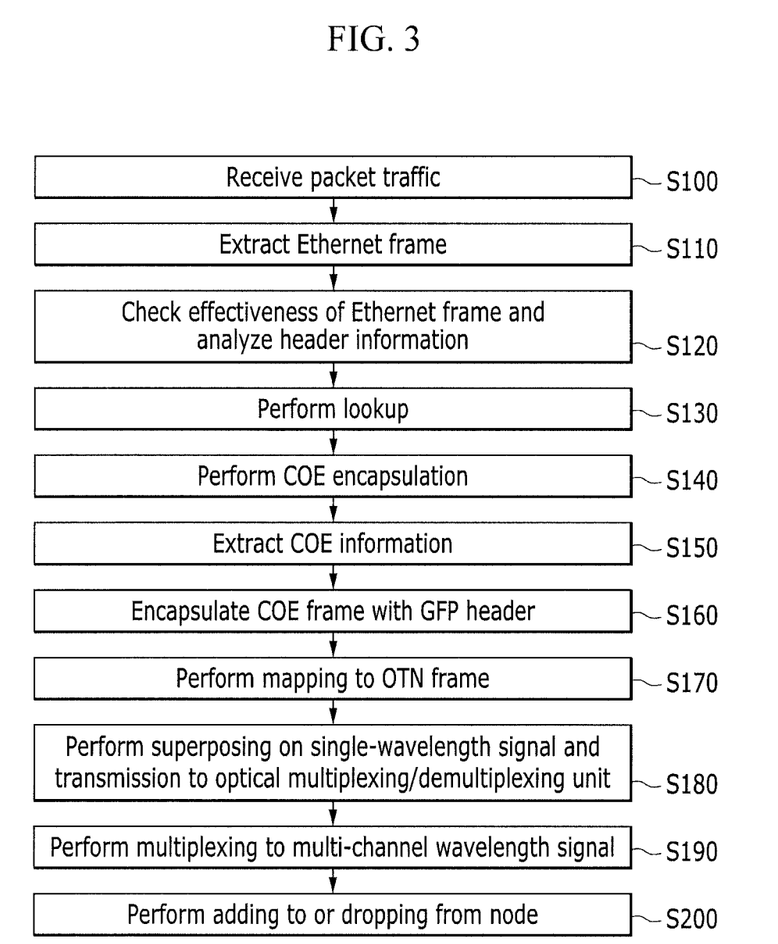
FIG. 3 is a view illustrating an example of a packet-optical transport method for a packet-optical integrated transport apparatus according to an exemplary embodiment of the present invention.

FIG. 3 is a view illustrating an example of a packet-optical transport method for a packet-optical integrated transport apparatus according to an exemplary embodiment of the present invention.

As shown in FIG. 3, when packet traffic is received from the Ethernet switch and router in the metro access region through the Ethernet optic interfaces 111 (S100), the Ethernet PHY 112 extracts an Ethernet frame and transmits the Ethernet frame to the packet processing/traffic managing unit 113 (S110). In this embodiment of the present invention, Ethernet frames having C-Tagged, S-Tagged and Untagged formats are described as examples. However, the present invention is not necessarily limited thereto.

The packet processing/traffic managing unit 113 checks effectiveness of the Ethernet frame received from the Ethernet PHY 112 and then analyzes the L2 or L3 header information (S120). Then, the packet processing/traffic managing unit 113 sequentially performs lookup through an external network control system (e.g., NMS/OSS, etc) by using some values of the header information as a retrieval key (S130). At this time, the lookup is performed by using COE mapping table information preset in the packet-optical integrated transport apparatus and a COE mapping table is the same as Table 1.

Next, the packet processing/traffic managing unit 113 performs COE encapsulation (B-DA, B-SA, B-Tag, I-Tag) based on IEEE 802.1Qay PBB-TE (S140), and transmits the encapsulated frame to the Ethernet-OTH unit 130 through the switch interfaces 114 and the packet switch unit 120.

TABLE 1

|  | Input file | Output file |
|---|---|---|
| IP flow-to-COE mapping | Input port<br>C-VID<br>DIP<br>SIP<br>Protocol<br>Destination port #<br>Source port # | Output port<br>B-DA<br>B-SA<br>B-VID<br>I-SID |
| Ethernet-to-COE mapping | Input port<br>C/S-VID | Output port<br>B-DA<br>B-SA<br>B-VID<br>I-SID |

At this time, when the received Ethernet frame is a C-Tagged frame, the packet processing/traffic managing unit 113 performs the lookup by using input port and C-VID values as a key to extract COE information such as whether a mapping method is an Ethernet-to-COE mapping method or an IP flow-to-COE mapping method, an output port value, and an Backbone Service Instance Identifier (I-SID) value (S150).

Here, when the mapping method is the Ethernet-to-COE method, the lookup is performed by using the I-SID as a key to obtain COE encapsulation information (backbone destination addess (B-DA), backbone source address (B-SA), and backbone VLAN indicator (B-VID) values). Meanwhile, when the mapping method is the IP FLOW-to-COE mapping method, I-SID information is updated by using, as a key, SIP, DIP, protocol, destination port, and source port values that are TCP/IP header information, and the lookup is performed by an I-SID value as a key to obtain the COE encapsulation information (B-DA, B-SA, and B-VID values).

Meanwhile, when the received Ethernet frame is an S-Tagged frame, the packet processing/traffic managing unit 113 performs the Ethernet-to-COE mapping. Then, the packet processing/traffic managing unit 113 performs lookup by using the input port and S-VID values as a retrieval key to obtain output port and I-SID values, and performs lookup by using the I-SID value as a key to obtain the COE encapsulation information (B-DA, B-SA, and B-VID values).

When the received Ethernet frame is an untagged frame without a C/S-Tag, the packet processing/traffic managing unit 113 performs Ethernet-to-COE mapping. Then, the packet processing/traffic managing unit 113 uses the input port value as a key to obtain the output port and I-SID values and uses the I-SID value as a key to obtain the COE encapsulation information (B-DA, B-SA, and B-VID values). In a case of the untagged frame, port-based mapping using an output port as one COE tunnel is performed.

When the packet processing/traffic managing unit 113 performs encapsulation as described above, the GFP/OTH mapper 133 of the Ethernet-OTH unit 130 encapsulates the COE frame received through the packet processor 132 with a GFP header (S160). At this time, the encapsulation may mean encapsulating with the GFP header (packet length indication (PLI), cHEC, Type, tHEC, GFP expansion header) through a generic framing procedure (GFP) framer based on ITU-T G.7041, for example. However, the present invention is not necessarily limited thereto.

After encapsulation is performed, in order for mapping to an OTN frame based on ITU-T G.709, encapsulation is performed again with an OTN overhead such as an foreign agent (FA) overhead, an optical physical unit-2 (OPU2) overhead, an optical channel data unit-2 (ODU-2) overhead, or an OTU-2 overhead (S170). Then, the frame is superposed on a single wavelength signal assigned to the Ethernet-OTH unit 130 and is transmitted to the optical multiplexing/demultiplexing unit 210 through the WDM optic interfaces 134 (S180).

When receiving the single wavelength signal, in order to transmit the single wavelength signal corresponding to the OTU-2 channel through a signal optical fiber, the optical multiplexing/demultiplexing unit 210 multiplexes the single wavelength signal to a multi-channel wavelength signal (S190). Here, a method of multiplexing the single wavelength signal to the multi-channel wavelength signal is well-known, and thus a detailed description thereof is not omitted in the embodiment of the present invention.

When the optical multiplexing/demultiplexing unit 210 multiplexes the single wavelength signal to the multi-channel wavelength signal, the wavelength switch unit 220 adds or drops the multi-channel wavelength signal to or from the node such that the corresponding signal can be transmitted (S200).

According to the embodiments of the present invention, in order to transport packet-optical signals through a signal system, it is possible to integrate transport networks, which have multiple network structures and exist in individual functional layers, into a transport network having a single network structure.

Further, it is possible to remarkably reduce the capacity and the number of routers in the network, to provide an optimal traffic path, and to maximize efficiency of link use. Furthermore, it is possible to reduce installation investment costs and operation/administration/maintenance costs through hardware cost reduction, power consumption reduction, easiness of interlayer resource management, provision of interlayer traffic engineering, etc.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A packet-optical integrated transport apparatus comprising:
   a packet transmitter for outputting single-wavelength signal multiplexed to a predetermined channel on the basis of packet traffic or circuit traffic input from a metro access region;

an optical transmitter for multiplexing the single-wavelength signal output from the packet transmitter to a multi-channel wavelength signal and adding or dropping the multiplexed multi-channel wavelength signal to or from a node; and a system controller configured for transmitting constituent element initialization information to the packet transmitter and the optical transmitter and receiving constituent element operation status information, wherein:

the packet transmitter includes an Ethernet unit configured for outputting connection-oriented Ethernet (COE) tunnel information by using the packet traffic;

a packet switch unit checking a destination of the packet traffic from the COE tunnel information output from the Ethernet unit and switching the packet;

an Ethernet-optical transport hierarchy (OTH) unit for analyzing the COE tunnel information and forwarding the switched packet from the packet switch unit to a corresponding port; and an OTH unit for receiving the circuit traffic, to superpose traffic on an assigned single wavelength, and outputting the traffic.

2. A packet-optical integrated transport apparatus comprising:

a packet transmitter for outputting single-wavelength signal multiplexed to a predetermined channel on the basis of packet traffic or circuit traffic input from a metro access region;

an optical transmitter for multiplexing the single-wavelength signal output from the packet transmitter to a multi-channel wavelength signal and adding or dropping the multiplexed multi-channel wavelength signal to or from a node; and a system controller configured for transmitting constituent element initialization information to the packet transmitter and the optical transmitter and receiving constituent element operation status information, wherein:

the packet transmitter includes an Ethernet unit configured for outputting connection-oriented Ethernet (COE) tunnel information by using the packet traffic;

a packet switch unit checking a destination of the packet traffic from the COE tunnel information output from the Ethernet unit and switching the packet;

an Ethernet-optical transport hierarchy (OTH) unit for analyzing the COE tunnel information and forwarding the switched packet from the packet switch unit to a corresponding port; and an OTH unit for receiving the circuit traffic, to superpose traffic on an assigned single wavelength, and outputting the traffic, wherein:

the Ethernet unit includes an Ethernet optic interface for transmitting the received packet traffic;

an Ethernet PHY for extracting an Ethernet frame from the packet traffic received from the Ethernet optic interface;

a packet processing/traffic managing unit for analyzing a header of the Ethernet frame, generating header information, define an IP flow on the basis of the generated header information, performing mapping to a COE tunnel, and output the COE tunnel information;

a switch interface for connecting the Ethernet unit and the packet switch unit; and a line control processor for receiving the constituent element initialization information from the system controller or transmitting the constituent element status information of the Ethernet unit to the system controller.

3. The apparatus of claim 2, wherein:

the packet processing/traffic managing unit performs polishing, shaping, and scheduling for ensuring service quality of the COE tunnel.

4. A packet-optical integrated transport apparatus comprising:

a packet transmitter for outputting single-wavelength signal multiplexed to a predetermined channel on the basis of packet traffic or circuit traffic input from a metro access region;

an optical transmitter for multiplexing the single-wavelength signal output from the packet transmitter to a multi-channel wavelength signal and adding or dropping the multiplexed multi-channel wavelength signal to or from a node; and a system controller configured for transmitting constituent element initialization information to the packet transmitter and the optical transmitter and receiving constituent element operation status information, wherein:

the packet transmitter includes an Ethernet unit configured for outputting connection-oriented Ethernet (COE) tunnel information by using the packet traffic;

a packet switch unit checking a destination of the packet traffic from the COE tunnel information output from the Ethernet unit and switching the packet;

an Ethernet-optical transport hierarchy (OTH) unit for analyzing the COE tunnel information and forwarding the switched packet from the packet switch unit to a corresponding port; and an OTH unit for receiving the circuit traffic, to superpose traffic on an assigned single wavelength, and outputting the traffic, wherein:

the Ethernet-OTH unit includes a switch interface for connecting the packet switch unit and the Ethernet-OTH unit and transmitting the packet;

a packet transmitter for analyzing the COE tunnel information from the packet received through the switch interface and forwarding the packet to the corresponding port;

a mapper for mapping the COE tunnel to an optical transport unit channel;

a wavelength division multiplexing (WDM) optic interface for transmitting the packet to the optical transmitter as a single wavelength signal by carrying the packet on a single wavelength assigned to the Ethernet-OTH unit; and a line control processor for receiving the constituent element initialization information form the system controller or transmitting the constituent element status information of the Ethernet-OTH unit to the system controller.

5. A packet-optical integrated transport apparatus comprising:

a packet transmitter for outputting single-wavelength signal multiplexed to a predetermined channel on the basis of packet traffic or circuit traffic input from a metro access region;

an optical transmitter for multiplexing the single-wavelength signal output from the packet transmitter to a multi-channel wavelength signal and adding or dropping the multiplexed multi-channel wavelength signal to or from a node; and a system controller configured for transmitting constituent element initialization information to the packet transmitter and the optical transmitter and receiving constituent element operation status information, wherein:

the packet transmitter includes an Ethernet unit configured for outputting connection-oriented Ethernet (COE) tunnel information by using the packet traffic;

a packet switch unit checking a destination of the packet traffic from the COE tunnel information output from the Ethernet unit and switching the packet;

an Ethernet-optical transport hierarchy (OTH) unit for analyzing the COE tunnel information and forwarding the switched packet from the packet switch unit to a corresponding port; and an OTH unit for receiving the circuit traffic, to superpose traffic on an assigned single wavelength, and outputting the traffic, wherein:

the OTH unit includes an TDM optic interface for receiving the circuit traffic;

a framer for multiplexing the circuit traffic received from the TDM optic interface to an optical transport unit channel;

an OTH mapper for performing frame mapping on the circuit traffic multiplexed in the framer and outputting the circuit traffic;

a WDM optic interface for transmitting the circuit traffic to the optical transmitter as a single wavelength signal by carrying the circuit traffic on a single wavelength assigned to the OTH unit; and a line control processor for receiving the constituent element initialization information from the system controller or transmitting the constituent element status information of the OTH unit to the system controller.

6. The apparatus of claim 4, wherein:

the optical transmitter includes an optical multiplexing/demultiplexing unit for multiplexing the single wavelength signal received from the Ethernet-OTH unit or the OTH unit to a multi-channel wavelength signal; and a wavelength switch unit for adding or droppng the multi-channel wavelength signal received from the optical multiplexing/demultiplexing unit to or from the node.

7. A packet-optical transport method for a packet-optical integrated transport apparatus comprising:

outputting connection oriented Ethernet (COE) tunnel information by using packet traffic input from a metro access region;

switching a packet by checking a destination of the packet traffic from the COE tunnel information;

forwarding the packet to a corresponding port by analyzing the COE tunnel information; and multiplexing the forwarded packet to a multi-channel wavelength signal and adding or dropping the multi-channel wavelength signal to or from a node.

8. The method of claim 7, wherein:

the outputting of the COE tunnel information includes extracting an Ethernet frame from the packet traffic;

analyzing a header of the Ethernet frame and generating header information; and defining an Ethernet flow on the basis of the generated header information, performing mapping to a COE tunnel, and outputting the COE tunnel information.

9. The method of claim 8, wherein:

the header information is header information extracted from a second layer header or a third layer header, and the IP flow includes one or more of best effort video, video on demand (VoD), and an Internet phone.

10. The method of claim 7, wherein:

the switching of the packet includes analyzing the COE tunnel information and forwarding the packet to a corresponding port;

mapping the COE tunnel to an optical transport unit channel; and superposing the packet on an allocated single wavelength and outputting it as a single-wavelength signal.

11. The method of claim 7, wherein:

the adding or dropping to or from node includes multiplexing received single-wavelength signal to a multi-channel wavelength signal; and adding or dropping the multiplexed multi-channel wavelength signal to or from the node.

* * * * *